US012613594B2

(12) United States Patent
Yao et al.

(10) Patent No.: US 12,613,594 B2
(45) Date of Patent: Apr. 28, 2026

(54) TOUCH DETECTION CIRCUIT AND TOUCH DEVICE

(71) Applicant: JADARD TECHNOLOGY INC., Shenzhen (CN)

(72) Inventors: Tuo-Yu Yao, Hsinchu (TW); Yu-Chieh Hsu, Tainan (TW)

(73) Assignee: JADARD TECHNOLOGY INC., Shenzhen (CN)

( * ) Notice: Subject to any disclaimer, the term of this patent is extended or adjusted under 35 U.S.C. 154(b) by 0 days.

(21) Appl. No.: 19/185,536

(22) Filed: Apr. 22, 2025

(65) Prior Publication Data

US 2026/0003460 A1     Jan. 1, 2026

(30) Foreign Application Priority Data

Jun. 29, 2024     (CN) .......................... 202410875148.3

(51) Int. Cl.
*G06F 3/041*          (2006.01)
(52) U.S. Cl.
CPC ................................. *G06F 3/04166* (2019.05)
(58) Field of Classification Search
CPC ........ G06F 3/0412; G06F 3/041; G06F 3/044; G06F 3/0416
See application file for complete search history.

(56) References Cited

U.S. PATENT DOCUMENTS

2018/0267639 A1* 9/2018 Han ...................... G06F 3/0418

FOREIGN PATENT DOCUMENTS

CN          115617199 A       1/2023

* cited by examiner

*Primary Examiner* — Koosha Sharifi-Tafreshi
(74) *Attorney, Agent, or Firm* — ScienBiziP, P.C.

(57)                    ABSTRACT

A touch detection circuit is provided, including an analog-to-digital conversion circuit configured to receive an analog touch signal output by touch electrodes and convert the analog touch signal into a digital touch signal; a spectrum extraction circuit electrically connected to the analog-to-digital conversion circuit and configured to obtain a component signal corresponding to at least one preset frequency of the digital touch signal within a preset time interval; an amplitude and phase extraction circuit electrically connected to the spectrum extraction circuit and configured to obtain an amplitude of the component signal, the touch detection circuit determines a touch position of the touch electrodes according to the amplitude of the component signal. A touch device is further provided. Thereby, the touch detection circuit and touch device provided by the present application can reduce the bus bandwidth required for data transmission and lower the power consumption of the processor.

14 Claims, 4 Drawing Sheets

TOUCH DETECTION CIRCUIT AND TOUCH DEVICE

CROSS-REFERENCE TO RELATED APPLICATIONS

This application claims priority to Chinese Patent Application No. 202410875148.3 filed on Jun. 29, 2024, in China National Intellectual Property Administration, the contents of which are incorporated by reference herein.

FIELD

The subject matter herein generally relates to field of touch control technology, particularly to a touch detection circuit and a touch device.

BACKGROUND

Touch devices typically determine whether a user has touched the device by detecting voltage of touch electrodes via a processor. Specifically, during a detection cycle, the touch device scans multiple touch electrodes and acquires their voltage data. Due to the high scanning frequency, a large amount of voltage data is generated, requiring the bus transmitting this voltage data to have significant bandwidth and resulting in elevated power consumption for the processor.

BRIEF DESCRIPTION OF THE DRAWINGS

Implementations of the present disclosure will now be described, by way of embodiments, with reference to the attached figures.

DETAILED DESCRIPTION

Figure 1:
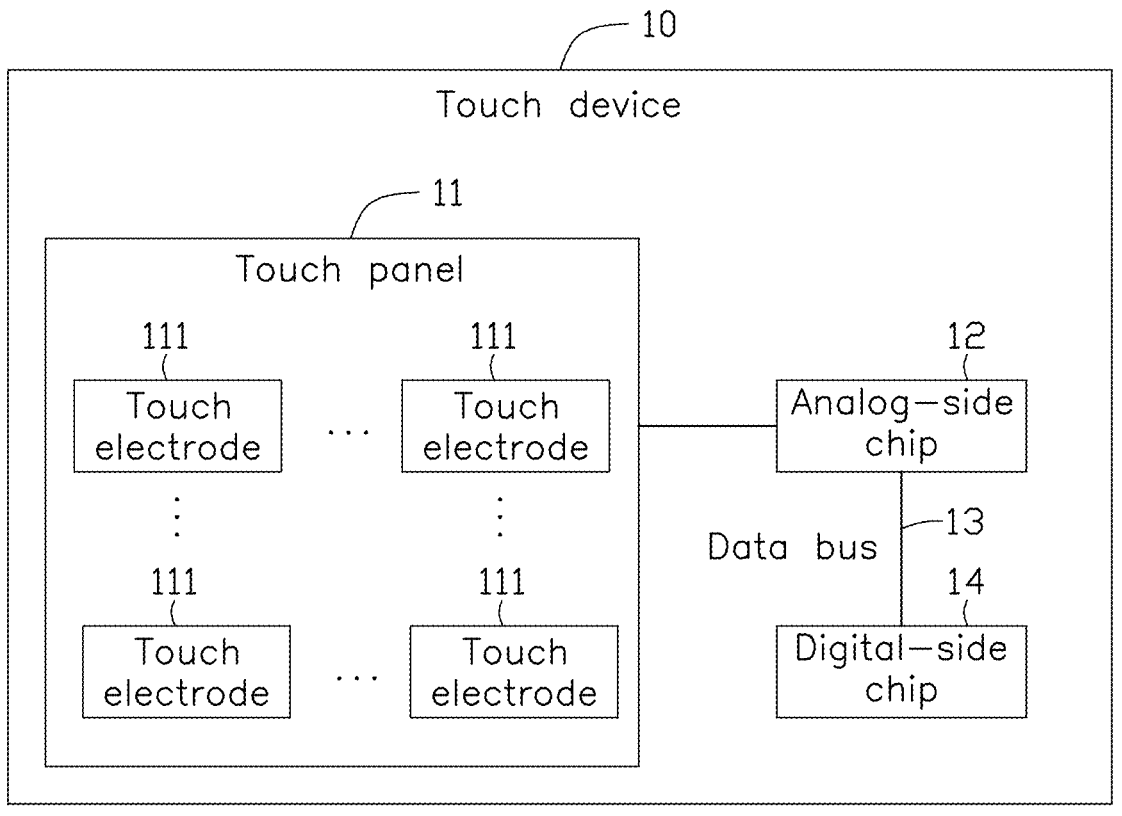
FIG. 1 is a schematic diagram of an embodiment of an application of a touch device according to the present application.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

Touch devices typically determine whether a user has touched the device by detecting voltage of touch electrodes via a processor. Specifically, during a detection cycle, the touch device scans multiple touch electrodes and acquires their voltage data. Due to the high scanning frequency, a large amount of voltage data is generated, requiring the bus transmitting this voltage data to have significant bandwidth and resulting in elevated power consumption for the processor.

Therefore, this application provides a touch detection circuit and detection device, which can reduce the bus bandwidth of data transmission and reduce the power consumption of the processor.

Referring to FIG. 1, FIG. 1 is a schematic diagram of the application of a touch device 10. The touch device 10 includes a touch panel 11, an analog-side chip 12, and a digital-side chip 14. The analog-side chip 12 and the digital-side chip 14 are connected through data bus 13.

The touch panel 11 includes a plurality of touch electrodes 111, the plurality of touch electrodes 111 are arranged in rows and columns, that is, plurality of touch electrodes 111 are filled as a rectangular according to the rows and columns sequence. Each touch electrode 111 can output analog touch signals, the analog touch signal represents the voltage value of each touch electrode 111, and a specific position of the touched touch electrode 111 can be determined according to the analog touch signal output by each touch electrode 111.

The analog-side chip 12 is used to obtain the analog touch signal, perform signal processing such as analog to digital conversion on the analog touch signal, and obtain the digital touch signal after processing. The digital touch signal is transmitted to the digital-side chip 14 through the data bus 13.

The digital-side chip 14 is used to receive the digital touch signal and conduct further signal processing on the digital touch signal to obtain the determination result of whether the touch electrode 111 is touched and the specific position of the touch electrode 111.

Figure 2:
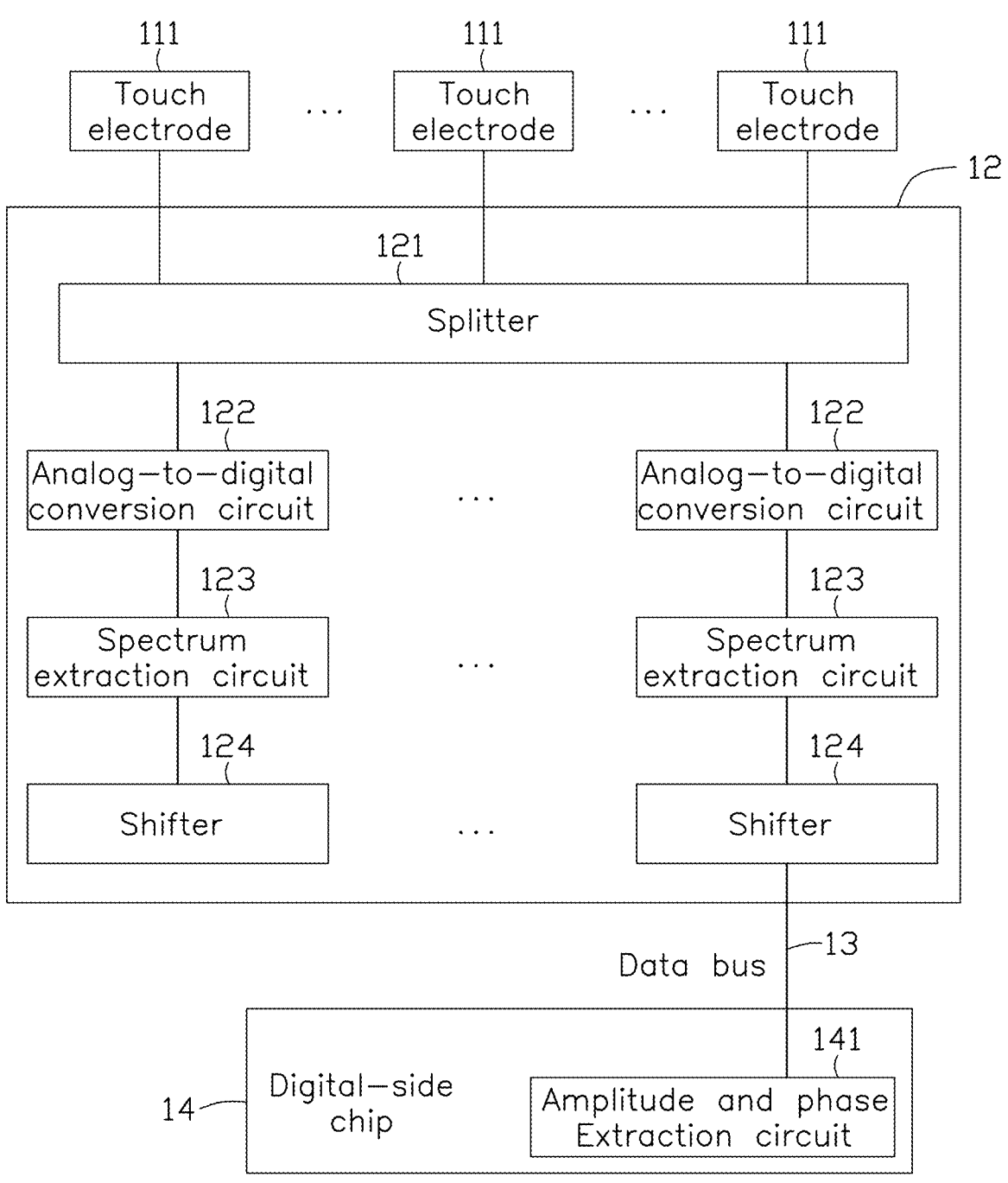
FIG. 2 is a schematic diagram of an embodiment of an application of an analog-side chip and a digital-side chip.

Specifically, please refer to FIG. 2, a splitter 121, analog-to-digital conversion circuits 122, spectrum extraction circuits 123, and shifters 124 are arranged on the analog-side chip 12.

The splitter 121 is electrically connected to each of the touch electrodes 111, in one detection cycle, the splitter 121 receives the analog touch signals output by all the touch electrodes 111, and outputs the analog touch signals corresponding to the touch electrodes 111 in one column/row to the analog-to-digital conversion circuits 122.

Specifically, the splitter 121 can output the analog touch signals corresponding to the row/column touch electrodes 111 by selecting one row or one column of touch electrodes 111 to be connected with the analog-to-digital conversion circuit 122.

In some embodiments, a column/row of touch electrodes 111 corresponding to the analog touch signals to be output selected by the splitters 121 during a detection cycle may be set according to actual needs, for example, during the detection cycle, the splitters 121 may select the analog touch signals output corresponding to the touch electrodes 111 in the first column. During the next detection cycle, the splitter 121 can select the analog touch signals output corresponding to the touch electrodes 111 in the second column.

The analog-to-digital conversion circuits 122 are electrically connected to the splitter 121. The analog-to-digital conversion circuits 122 are used to convert the analog touch signals output by the splitter 121 to obtain the digital touch signal.

In some embodiments, the number of analog-to-digital conversion circuits 122 corresponds to the number of analog touch signals output by the splitters 121, that is, the number of analog-to-digital conversion circuits 122 corresponds to the number of touch electrodes 111 in a row/column. For example, when the number of touch electrodes 111 in a column/row set on the touch panel 11 is 50, the number of analog-to-digital conversion circuits 122 can also be set to 50.

In some embodiments, the analog-to-digital conversion circuit 122 samples the analog touch signal according to the preset sampling frequency and converts it into a digital touch signal. The preset sampling frequency can be set according to actual needs.

The spectrum extraction circuits 123 are electrically connected to the analog-to-digital conversion circuits 122. The spectrum extraction circuits 123 are used to extract the spectrum of the digital touch signal after conversion. Specifically, the spectrum extraction circuits 123 can extract the component signal corresponding to at least one preset frequency of the digital touch signal within a preset time interval.

The preset time interval can be set to a detection period, that is, the spectrum extraction circuit 123 can extract a component signal of a preset frequency in the digital touch signal corresponding to a column/row of touch electrodes 111 within a detection period. At this time, because the analog touch signal is sampled many times in a detection cycle by the analog-to-digital conversion circuits 122, the digital touch signal obtained by the analog-to-digital conversion circuits 122 also has multiple bits of data in a detection cycle. However, the component signal only indicates the amplitude/phase and other parameters of a preset frequency in the digital touch signal, so the data bits of the component signal are smaller than the data bits of the digital touch signal in a detection cycle. In this way, the number of data bits is reduced, so that the amount of data to be transmitted is reduced, which can reduce the transmission bandwidth demand of the subsequent transmission bus, improve the computing efficiency of the processor, and reduce the power consumption of the processor.

In some embodiments, the number of spectrum extraction circuits 123 is set corresponding to the number of analog-to-digital conversion circuits 122. Specifically, the number of spectrum extraction circuits 123 can be the same as or smaller than the number of analog-to-digital conversion circuits 122. For example, when the number of analog-to-digital conversion circuits 122 is 50, the number of spectrum extraction circuits 123 can be set to 50 to correspond to each of the analog-to-digital conversion circuits 122, or the number of spectrum extraction circuits 123 can also be set to 25. In this case, every two analog-to-digital conversion circuits 122 correspond to a spectrum extraction circuit 123.

When the number of spectrum extraction circuits 123 is less than the number of analog-to-digital conversion circuits

122, there is at least one spectrum extraction circuit 123 that needs to extract the component signals corresponding to two or more digital touch signals. Specifically, two or more digital touch signals can be multiplexed through Time Division Multiplexing (TDM), when two or more digital touch signals use the TDM, the frequency of the two or more digital touch signals is the same, and the timing is different. Therefore, the spectrum extraction circuit 123 can extract two or more component signals of digital touch signals at different times. In this way, when the number of spectrum extraction circuits 123 is less than the number of analog-to-digital conversion circuits 122, an integration degree of electronic components in the touch device 10 can be improved, the manufacturing cost of the touch device 10 can be reduced, and the working efficiency of spectrum extraction circuits 123 can be improved.

In some embodiments, the component signal includes a first component signal and a second component signal, the second component signal being the signal of the first component signal delayed by one bit in the time domain. In other words, the spectrum extraction circuits 123 receive the digital touch signals corresponding to a column/row of touch electrodes 111, and outputs the first component signals and the second component signals after spectrum extraction. The data bits and data amount of the first component signals and the second component signals are lower than the corresponding digital touch signals.

The shifters 124 are electrically connected to the spectrum extraction circuits 123. The shifters 124 are used to receive the corresponding component signals of each digital touch signal, and the corresponding component signals of each digital touch signal are arranged in turn to form serial data, and the serial data is transmitted to the digital-side chip 14 through the data bus 13.

In some embodiments, the number of shifters 124 may be set corresponding to the number of spectrum extraction circuits 123. For example, when the number of spectrum extraction circuits 123 is 50, the number of shifters 124 can also be set to 50 accordingly.

In some embodiments, an arrangement order of the component signals corresponding to each digital touch signal of the shifter 124 can be set according to the position relationship of multiple shifters 124 with respect to the data bus 13. The multiple shifters 124 are connected end to end to form a serial structure shifter string. The shifter 124 directly connected to the data bus 13 is defined as the serial head, and the other end opposite to the string head in the shifter serial is defined as the serial tail. In this case, the corresponding component signal received by the shifter 124 at the serial tail is transmitted to the shifter 124 at the previous bit on the serial, and the previous shifter 124 transmits the corresponding component signal received to the shifter 124 at the previous bit on the serial, and so on. Finally, the shifter 124 of the serial head transmits the received corresponding component signal to the data bus 13. In this case, the data transmitted to data bus 13 is the serial data formed after the corresponding component signals received from the serial head to the serial tail are arranged in turn. In this way, the efficiency of data transmission can be improved, the wiring cost of the data bus can be reduced, and the integration degree of the touch device 10 can be improved.

The digital-side chip 14 is provided with an amplitude and phase extraction circuit 141. The amplitude and phase extraction circuit 141 is electrically connected to the data bus 13. The amplitude and phase extraction circuit 141 is used to obtain the amplitude and/or phase values of the component signals, where the amplitude and/or phase values of the component signals are used to determine whether the corresponding touch electrode 111 is touched.

Specifically, when the amplitude of the component signal is detected to exceed a preset threshold, it can be determined that the touch operation of the touch electrode 111 corresponding to the component signal has occurred.

In some application scenarios, the amplitude of the component signal can be obtained to determine whether the corresponding touch electrode 111 is touched, for example, the application scenario where the user touches the touch panel 11 with his finger.

In some application scenarios, to determine whether the corresponding touch electrode 111 is touched, it is necessary to obtain the amplitude and phase values of the component signals, for example, in the application scenario of tapping the touch panel 11 through an active capacitive pen.

Figure 3:
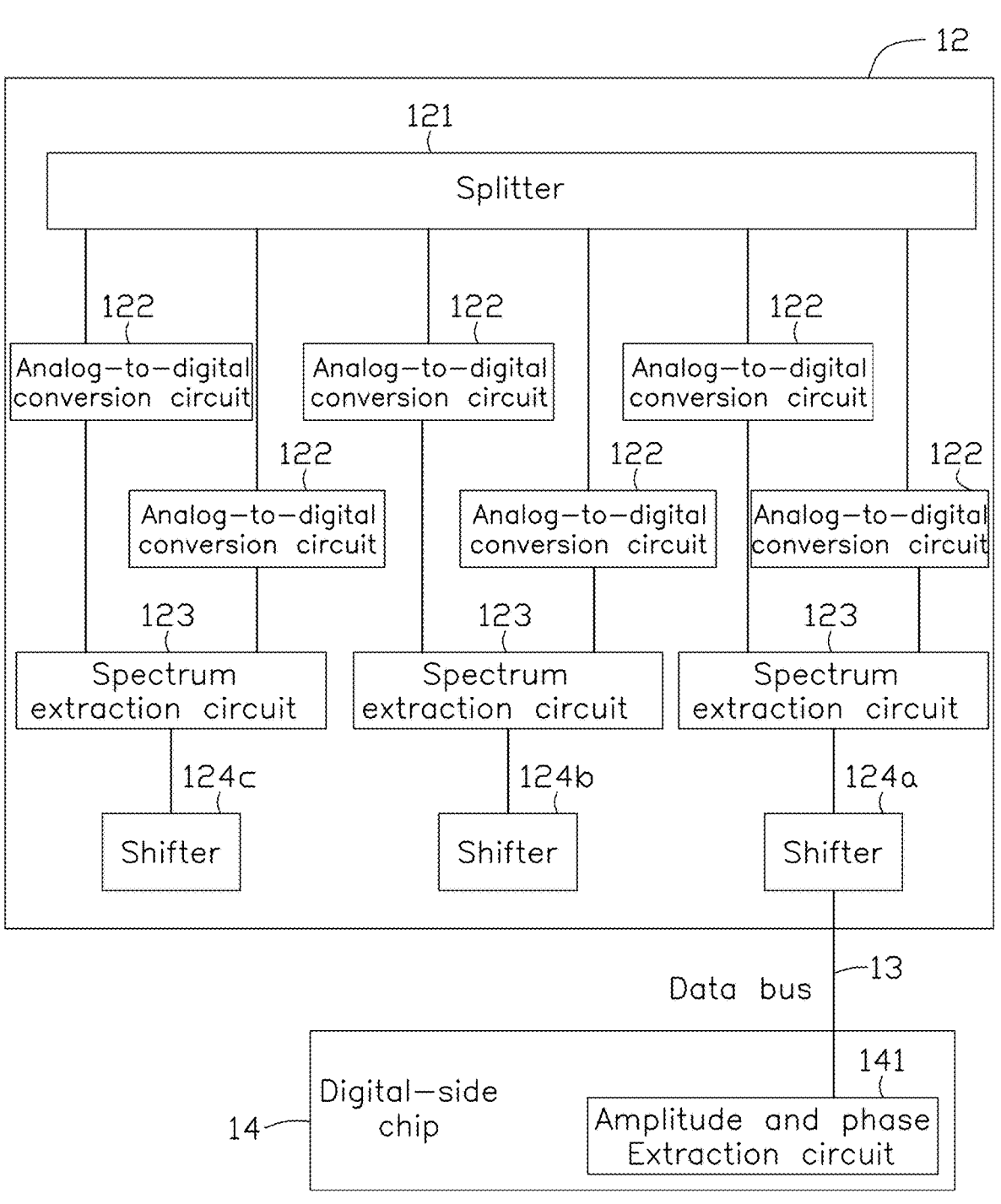
FIG. 3 is schematic diagram of another embodiment of the application of the analog-side chip and the digital-side chip.

Referring to FIG. 3, FIG. 3 is another schematic diagram of the application of the analog-side chip 12 and the digital-side chip 14. A s an example, the number of the touch electrodes 111 in a column/row is 6, but it is not regarded as the limit of the number of the touch electrodes 111 in this application.

The splitter 121 has six outputs, one for each of the touch electrodes 111 in a column/row. The splitter 121 outputs the analog touch signal of the corresponding touch electrode 111 to the analog-to-digital conversion circuit 122 through each output terminal.

The number of analog-to-digital conversion circuits 122 is six, and each analog-to-digital conversion circuit 122 corresponds to a splitter 121. The analog-to-digital conversion circuit 122 correspondingly converts the analog touch signal to a digital touch signal based on the preset sampling frequency.

The number of spectrum extraction circuits 123 is three, that is, each spectrum extraction circuit 123 corresponds to two analog-to-digital conversion circuits 122. The spectrum extraction circuit 123 extracts the spectrum of two digital touch signals output by two analog-to-digital conversion circuits 122 respectively, and obtains the component signals corresponding to the two digital touch signals. For example, two digital touch signals include a first digital touch signal and a second digital touch signal. The first digital touch signal and the second digital touch signal are respectively converted by two different analog-to-digital conversion circuits 122. The corresponding spectrum extraction circuit 123 extracts the corresponding first touch component signal and the second touch component signal in the first digital touch signal and the second digital touch signal and outputs them to the corresponding shifter.

Specifically, the spectrum extraction circuit 123 can receive the first digital touch signal in the first preset cycle, and receive the second digital touch signal in the second preset cycle, and realize the spectrum extraction of the first digital touch signal and the second digital touch signal in the detection cycle. The corresponding first touch component signal and second touch component signal in the first digital touch signal and the second digital touch signal are obtained. The first preset cycle and the second preset cycle are both time intervals within a detection cycle, and the length of the first preset cycle and the second preset cycle are both less than a detection cycle.

The shifter includes a first shifter 124a, a second shifter 124b and a third shifter 124c. The first shifter 124a, the second shifter 124b and the third shifter 124c are connected end to end in turn to form a shifter serial. The first shifter 124a is directly connected to the data bus 13, so the first shifter 124a is the serial head of the shifter serial, and the third shifter 124c is the serial tail of the shifter serial. The third shifter 124c transmits the received component signal to the second shifter 124b, and the second shifter 124b arranges the component signal received by itself and the component signal output from the third shifter 124c to the first shifter 124a. The first shifter 124a then arranges the component signals received by itself, the component signals output by the second shifter 124b, and the component signals output by the third shifter 124c to obtain serial data, and transmits them to the amplitude and phase extraction circuit 141 on the digital side chip 14 through the data bus 13.

The amplitude and phase extraction circuit 141 can obtain the amplitude and phase value of each component signal in the digital touch signal after receiving the serial data. The amplitude and phase value of the obtained component signal can be used as the calculation basis of the subsequent calculation element or control element to determine whether the corresponding touch electrode 111 is touched and the specific touch position.

Figure 4:
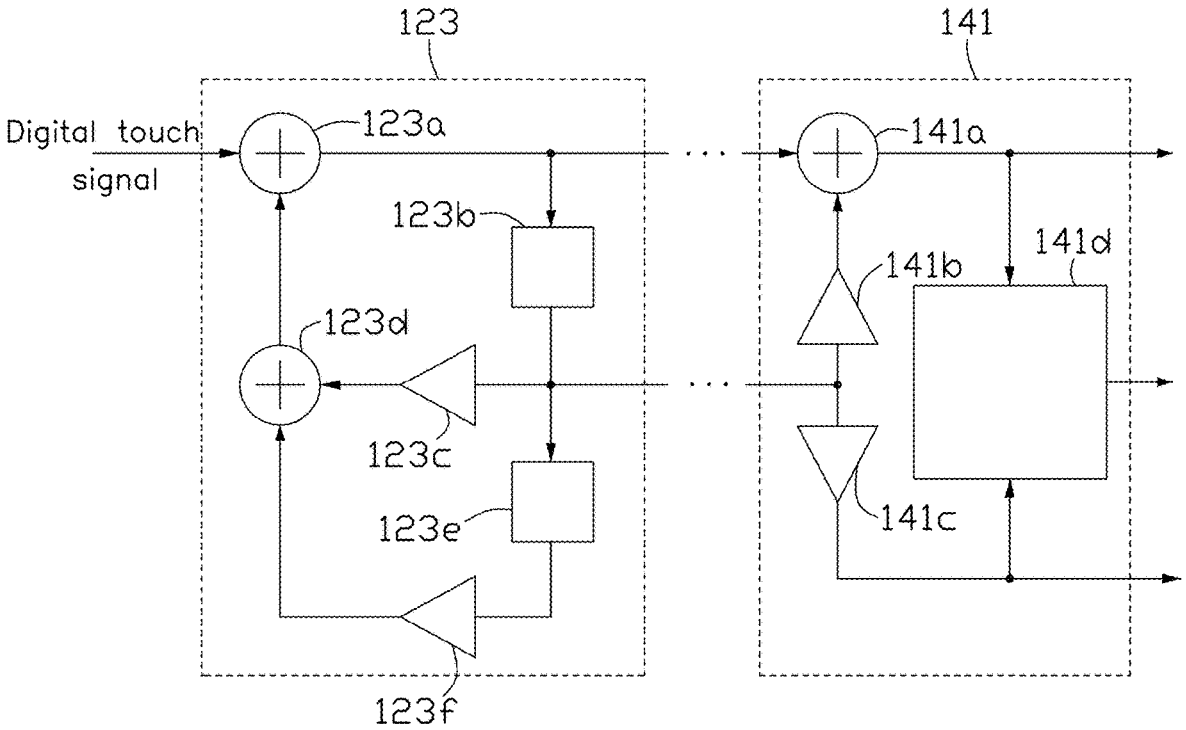
FIG. 4 is a schematic diagram of an embodiment of an application of a spectrum extraction circuit and an amplitude and phase extraction circuit.

Referring to FIG. 4, FIG. 4 is a schematic diagram of the application of the spectrum extraction circuit 123 and the amplitude and phase extraction circuit 141.

In some embodiments, the spectrum extraction circuit 123 may be a Goertzel filter. Here, the spectrum extraction circuit 123 is used as a Goertzel filter as an example to illustrate.

The spectrum extraction circuit 123 includes a first adder 123a, a first delay unit 123b, a first amplifier 123c, a second adder 123d, a second delay unit 123e, and a second amplifier 123f.

A first input end of the first adder 123a receives the digital touch signal, a second input end of the first adder 123a is connected to an output end of the second adder, an output end of the first adder 123a is the first output end of the spectrum extraction circuit 123, the first output end is used to output the first component signal Q[n] corresponding to the digital touch signal. The output end of the spectrum extraction circuit 123 is also connected to the input end of the first delay unit 123b. The output end of the first delay unit 123b is the second output end of the spectrum extraction circuit 123, and the second output end is used to output the second component signal Q[n−1] corresponding to the digital touch signal. The second component signal is the one bit after the delay of the first component signal in the time domain. The output terminal of the first delay unit 123b is also connected to the input terminal of the second delay unit 123e, the input terminal of the first amplifier 123c, the output terminal of the first amplifier 123c is connected to the first input terminal of the second adder 123d, the output terminal of the second delay 123e is connected to the input terminal of the second amplifier 123f, the output terminal of the second amplifier 123f is connected to the first input terminal of the second adder 123d, and the output terminal of the second amplifier 123f is connected to the second input terminal of the second adder 123d.

The amplification factor of the first amplifier 123c is associated with the preset frequency value of the component signal. Therefore, the amplification factor of the first amplifier 123c can be adjusted according to the preset frequency value of the component signal by changing the amplification factor of the first amplifier 123c.

Specifically, the first component signal Q[n] output by the spectrum extraction circuit 123 satisfies the following equation (1):

$$Q[n] = pQ[n-1] - Q[n-2] + x[n] \qquad (1)$$

Where p is the amplification factor of the first amplifier 123c, usually p=2 cos(2πfn), and f is the preset frequency.

In some examples, the amplification factor of the first amplifier 123c can also be multiple, and multiple component signals corresponding to multiple frequencies of the digital touch signal can be obtained by switching to different amplification factors in a detection cycle. In this way, the touch device 10 can be suitable for use in scenarios where multiple different preset frequencies need to be set, for example, when the user taps the touch panel 11 with an active capacitive pen. Specifically, the active capacitive pen includes two electrodes that can emit signals at different frequencies to the touch device 10, respectively, so that the digital touch signal may include two different frequency components corresponding to the two electrodes. At this time, the multiple amplification coefficients of the first amplifier 123c correspond to the frequencies of different frequency components of the digital touch signal, and the extraction of the two frequency components can be realized without adding other circuit components. The spectrum extraction circuit 123 outputs the first component signal Q[n] and the second component signal Q[n−1], which are transmitted to the amplitude and phase extraction circuit 141 through the shifter 124 and data bus 13. The amplitude and phase extraction circuit 141 includes an adder 141a, a first amplifier 141b, a second amplifier 141c, and a computing unit 141d. The first input terminal of the adder 141a is connected to the corresponding shifter 124 through the data bus 13 to receive the first component signal Q[n]. The second input terminal of the adder 141a is connected to the output terminal of the first amplifier 141b, and the output terminal of the adder 141a is connected to the first input terminal of the computing unit 141d, and outputs the phase real part signal re at the same time, the phase real part signal re represents the phase real part value of the digital touch signal at the preset frequency. The input terminal of the first amplifier 141b is connected to the input terminal of the value second amplifier 141c and is connected to the corresponding shifter 124 through the data bus 13 to receive the second component signal Q[n−1]. The output terminal of the second amplifier 141c is connected to the second input terminal of the computing unit 141d and simultaneously outputs the phase imaginary part signal im, which represents the phase imaginary part value of the digital touch signal at the preset frequency. According to the phase real part signal re and the phase imaginary part signal im, the computing unit 141d calculates the amplitude signal amp which represents the amplitude of the digital touch signal at the preset frequency.

In some embodiments, the phase real part signal re and the phase imaginary part signal im may also be used to indicate the data included in the digital touch signal. For example, in the application scenario of the active capacitive pen tapping the touch panel 11, the digital touch signal can include the pressure sensing data and color data of the capacitive pen, etc. Through the phase difference between the real part signal re and the imaginary part signal im, the digital touch signal can be demodulated by PSK or DPSK to obtain the data.

Therefore, the touch detection circuit and the detection device provided in the application can reduce the bus bandwidth of data transmission and reduce the power consumption of the processor.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. A touch detection circuit comprising:

an analog-to-digital conversion circuit configured to receive an analog touch signal output by touch electrodes and convert the analog touch signal into a digital touch signal;

a spectrum extraction circuit electrically connected to the analog-to-digital conversion circuit and configured to obtain a component signal corresponding to at least one preset frequency of the digital touch signal within a preset time interval; and an amplitude and phase extraction circuit electrically connected to the spectrum extraction circuit and configured to obtain an amplitude of the component signal, wherein the touch detection circuit determines a touch position of the touch electrodes according to the amplitude of the component signal.

2. The touch detection circuit according to claim 1, wherein the spectrum extraction circuit comprises a first adder, a first delay unit, a first amplifier, and a second adder, an output terminal of the first adder is connected to a first input terminal of the first adder through the first delay unit, the first amplifier, and the second adder, a second input terminal of the first adder receives the digital touch signal, and the output terminal of the first adder outputs the component signal.

3. The touch detection circuit according to claim 2, wherein amplification coefficients of the first amplifier are associated with the at least one preset frequency.

4. The touch detection circuit according to claim 3, wherein the amplification coefficients comprise a first amplification coefficient, the at least one preset frequency comprises a first preset frequency, and the first preset frequency corresponds to the first amplification coefficient.

5. The touch detection circuit according to claim 3, wherein the amplification coefficients comprise a first amplification coefficient and a second amplification coefficient, the at least one preset frequency comprises a first preset frequency and a second preset frequency, the first preset frequency corresponds to the first amplification coefficient, and the second preset frequency corresponds to the second amplification coefficient.

6. A touch device comprising:

a touch detection circuit comprising:

an analog-to-digital conversion circuit configured to receive an analog touch signal output by touch electrodes and convert the analog touch signal into a digital touch signal;

a spectrum extraction circuit electrically connected to the analog-to-digital conversion circuit and configured to obtain a component signal corresponding to at least one preset frequency of the digital touch signal within a preset time interval; and an amplitude and phase extraction circuit electrically connected to the spectrum extraction circuit and configured to obtain an amplitude of the component signal, wherein the touch detection circuit determines a touch position of the touch electrodes according to the amplitude of the component signal;

wherein the analog-to-digital conversion circuit and the spectrum extraction circuit are disposed on an analog-side chip, the amplitude and phase extraction circuit is disposed on a digital-side chip, and the analog-side chip is connected to the digital-side chip through a data bus.

7. The touch device according to claim 6, wherein the spectrum extraction circuit comprises a first adder, a first delay unit, a first amplifier, and a second adder, an output terminal of the first adder is connected to a first input terminal of the first adder through the first delay unit, the first amplifier, and the second adder, a second input terminal of the first adder receives the digital touch signal, and the output terminal of the first adder outputs the component signal.

8. The touch device according to claim 7, wherein amplification coefficients of the first amplifier are associated with the at least one preset frequency.

9. The touch device according to claim 8, wherein the amplification coefficients comprise a first amplification coefficient, the at least one preset frequency comprises a first preset frequency, and the first preset frequency corresponds to the first amplification coefficient.

10. The touch device according to claim 8, wherein the amplification coefficients comprise a first amplification coefficient and a second amplification coefficient, the at least one preset frequency comprises a first preset frequency and a second preset frequency, the first preset frequency corresponds to the first amplification coefficient, and the second preset frequency corresponds to the second amplification coefficient.

11. The touch device according to claim 6, wherein the touch electrodes are arranged in rows and columns, the analog-side chip further comprises a demultiplexer electrically connected between the analog-to-digital conversion circuit and each of the touch electrodes, and the demultiplexer is configured to select the analog touch signal corresponding to one of the rows or one of the columns of the touch electrodes to output to the analog-to-digital conversion circuit.

12. The touch device according to claim 11, wherein each of the touch electrodes in one of the rows or one of the columns that is in communication with the analog-to-digital conversion circuit is correspondingly connected to one analog-to-digital conversion circuit, and every two analog-to-digital conversion circuits are correspondingly connected to one spectrum extraction circuit.

13. The touch device according to claim 12, wherein the two analog-to-digital conversion circuits correspondingly connected to one spectrum extraction circuit are a first analog-to-digital conversion circuit and a second analog-to-digital conversion circuit, the first analog-to-digital conversion circuit outputs a first digital touch signal, the second analog-to-digital conversion circuit outputs a second digital touch signal, and the spectrum extraction circuit is configured to:

receive the first digital touch signal during a first preset period, receive the second digital touch signal during a second preset period, and output the component signal corresponding to the first digital touch signal and the component signal corresponding to the second digital touch signal within the preset time interval.

14. The touch device according to claim 6, wherein the analog-side chip is further provided with shifters, a number of the shifters corresponding to a number of the spectrum extraction circuits, the shifters are connected in series sequentially to the data bus, the shifters are configured to arrange each of the component signal output by the spectrum extraction circuits in sequence to form serial data, the serial data is transmitted to the amplitude-phase extraction circuit via the data bus.

* * * * *